(12) United States Patent
Grissom et al.

(10) Patent No.: US 12,234,919 B1
(45) Date of Patent: Feb. 25, 2025

(54) FLOW CHAMBER SHAFT FOR DISC COOLANT VALVES

(71) Applicant: Hanon Systems, Daejeon (KR)

(72) Inventors: Emma Michelle Grissom, Howell, MI (US); Jason Dale Perkins, Dexter, MI (US); Edward William Sanders, III, Monroe, MI (US); Sunil Kumar Harihar Onkarachari, Mississauga (CA)

(73) Assignee: HANON SYSTEMS, Daejeon (KR)

( * ) Notice: Subject to any disclaimer, the term of this patent is extended or adjusted under 35 U.S.C. 154(b) by 9 days.

(21) Appl. No.: 18/454,121

(22) Filed: Aug. 23, 2023

(51) Int. Cl.
*F16K 11/07* (2006.01)
*F16K 11/074* (2006.01)
*F16K 27/04* (2006.01)

(52) U.S. Cl.
CPC .......... *F16K 11/074* (2013.01); *F16K 27/045* (2013.01)

(58) Field of Classification Search
CPC .............................. F16K 11/074; F16K 27/045
See application file for complete search history.

(56) References Cited

U.S. PATENT DOCUMENTS

| | | | | |
|---|---|---|---|---|
| 1,292,829 | A * | 1/1919 | Lutz | F16K 11/074 137/625.11 |
| 11,808,372 | B1 * | 11/2023 | Grissom | F16K 3/08 |
| 2008/0083898 | A1 | 4/2008 | Chen et al. | |
| 2019/0309862 | A1 | 10/2019 | Yu et al. | |
| 2020/0132201 | A1 * | 4/2020 | Koepke | F16K 27/0227 |
| 2022/0186657 | A1 * | 6/2022 | Higuchi | F25B 5/02 |
| 2022/0186840 | A1 | 6/2022 | Kimura et al. | |
| 2023/0184338 | A1 * | 6/2023 | Chapman | F16K 11/0743 137/119.04 |
| 2023/0193906 | A1 | 6/2023 | Chapman | |
| 2024/0001731 | A1 * | 1/2024 | Chapman | F16K 11/0856 |

FOREIGN PATENT DOCUMENTS

WO 2022249132 A1 12/2022

* cited by examiner

Primary Examiner — P. Macade Nichols
(74) Attorney, Agent, or Firm — James D. Miller; Shumaker, Loop & Kendrick, LLP (57) ABSTRACT

A rotary disc valve includes a rotatable assembly having a drive shaft with a flow control wall. The flow control wall includes an inner surface and an outer surface. The inner surface of defines a flow chamber within the drive shaft. A rotary disc is coupled to the drive shaft and is configured to rotate in unison therewith. The rotary disc includes an inner flow passage and an outer flow passage formed therethrough. The inner flow passage is always axially aligned with and fluidly coupled to the flow chamber of the drive shaft and the outer flow passage is always fluidly coupled to the outer surface of the flow control wall. A fixed disc sealing engages the rotary disc and includes a first flow opening, a second flow opening, and a third flow opening formed therethrough and disposed around the axis of rotation of the drive shaft.

20 Claims, 5 Drawing Sheets

FLOW CHAMBER SHAFT FOR DISC COOLANT VALVES

FIELD OF THE INVENTION

The disclosure relates to a rotary fluid valve, and more particularly, to a rotary fluid valve having a flow control assembly including a drive shaft with an integrated flow chamber.

BACKGROUND OF THE INVENTION

Vehicle heat exchanges, such as radiators, typically have valves which are used to control the rate that a fluid such as a coolant, for example, is allowed to flow through the system. With the increase in government mandated fuel economy regulations, companies are increasingly looking for new technology that will reduce the parasitic losses and improve efficiency of internal combustion engines. Furthermore, the introduction of hybrid and fully electric vehicle powertrains has introduced powertrain and thermal management complexities due to the need to control the temperature of batteries, inverter electronics, electric motors, etc. These trends lead to the need for more intelligently controlled fluid valve systems.

Conventional valve systems include diverter balls, cylinders, and the like to enable the heat exchangers to receive various intake and exhaust flows. As such, a single heat exchanger may function as a charge air cooler (CAC), exhaust gas recirculation (EGR) cooler, and heat recovery device. While these designs may provide adequate performance for proportional flow applications, they do have some drawbacks. For example, such valve systems are cost prohibitive and require complex assemblies.

Another concern that may be evident may relate to inconsistent flow conditions through each of the different flow paths associated with the fluid valve, such as including an undesired constriction of one or more flow paths through the fluid valve, or an undesirable number of changes in flow direction, when the fluid valve is switchable between multiple different modes of operation. That is, the various different flow paths that may be formed through the fluid valve may have differing effects on the fluid flowing therethrough depending on the selected mode of operation, which may negatively affect the performance of the fluid valve during certain flow configurations therethrough.

Accordingly, it would be desirable to produce a rotary valve wherein a weight, a cost, and complexity thereof is minimized, while optimizing a performance thereof.

SUMMARY OF THE INVENTION

In concordance and agreement with the presently described subject matter, a rotary valve wherein a weight, a cost, and complexity thereof is minimized, while optimizing a performance thereof, has surprisingly been discovered.

In one embodiment, a rotary disc valve comprises a rotatable assembly and a fixed disc. The rotatable assembly includes a drive shaft configured to selectively rotate about an axis of rotation thereof. The drive shaft has a central shaft and a flow control wall extending outwardly from the central shaft. The flow control wall includes an inner surface and an outer surface. The inner surface of the flow control wall defines a flow chamber within the drive shaft. A rotary disc is coupled to the drive shaft and is configured to rotate in unison therewith. The rotary disc includes an inner flow passage and an outer flow passage formed therethrough. The inner flow passage is always axially aligned with and fluidly coupled to the flow chamber of the drive shaft and the outer flow passage is always fluidly coupled to the outer surface of the flow control wall. A fixed disc sealingly engages the rotary disc and includes a first flow opening, a second flow opening, and a third flow opening formed therethrough and disposed around the axis of rotation of the drive shaft. The rotatable assembly is rotatably adjustable to a plurality of rotational positions via the selective rotation of the drive shaft about the axis of rotation thereof. Each of the rotational positions includes the inner flow passage of the rotary disc fluidly coupling the flow chamber of the drive shaft to a pair of the first flow opening, the second flow opening, and the third flow opening and the outer flow passage of the rotary disc fluidly coupling the outer surface of the flow control wall to a remaining one of the first flow opening, the second flow opening, and the third flow opening not forming the pair fluidly coupled to the inner flow passage.

Further areas of applicability will become apparent from the description provided herein. The description and specific examples in this summary are intended for purposes of illustration only and are not intended to limit the scope of the present disclosure.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION OF AN EMBODIMENT OF THE DISCLOSURE

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, all compositional percentages are by weight of the total composition, unless otherwise specified. Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
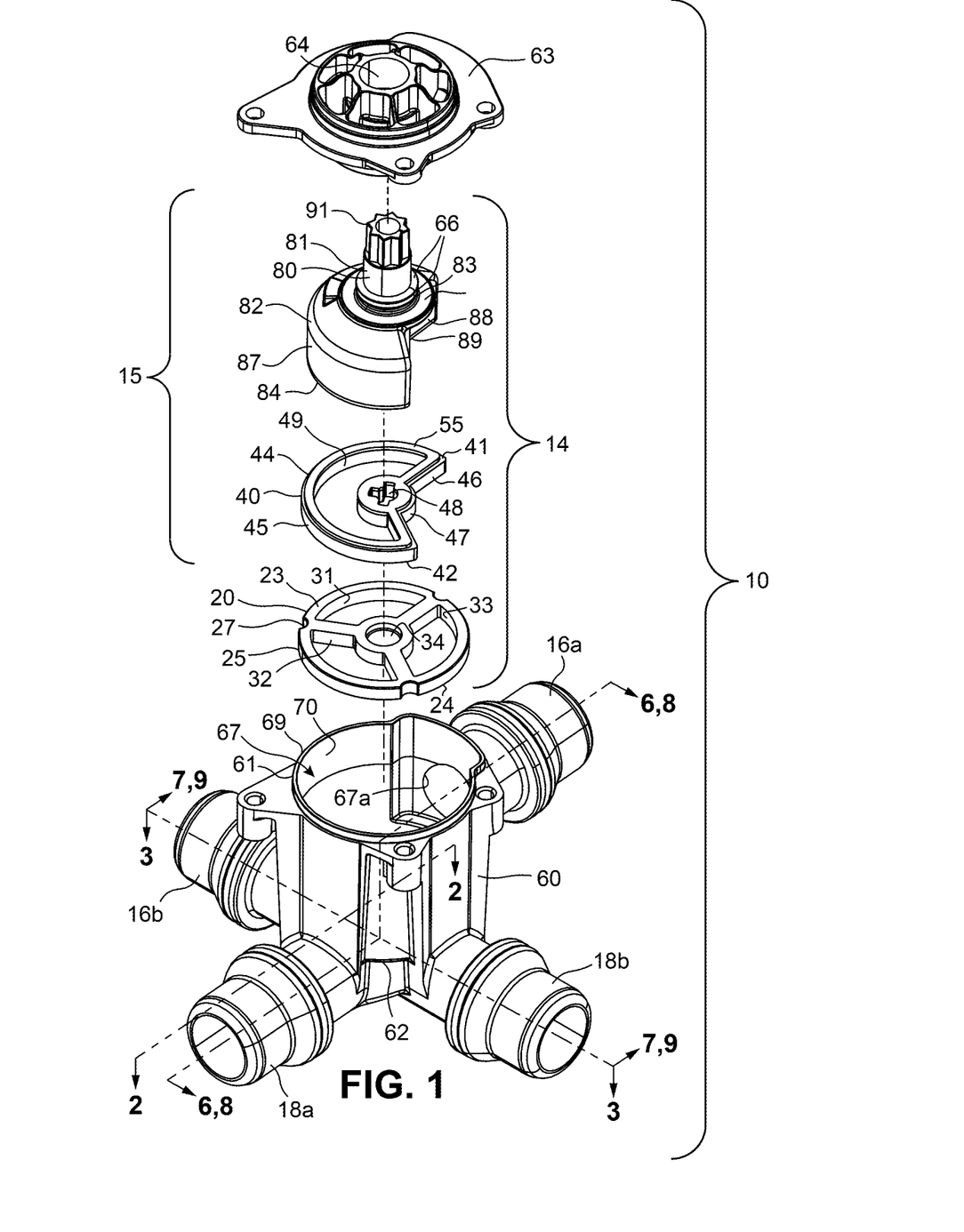
FIG. 1 is a partially exploded perspective view of a rotary valve according to an embodiment of the present disclosure, wherein the rotary valve includes a housing having a flow control assembly disposed therein.

FIG. 1 illustrates a rotary valve 10 in accordance with an embodiment of the present disclosure. The rotary valve 10 may be in fluid communication with at least one fluid source (not depicted) for supplying at least one fluid (not depicted) and at least one fluid destination (not depicted) for receiving at least one fluid (not depicted). In certain embodiments, the rotary valve 10 may comprise a valve housing 60 and a flow control assembly 14 disposed therein. The flow control assembly 14 comprises a fixed disc 20, a rotary disc 40, a biasing seal 55, and a drive shaft 80 having a flow chamber 95 integrated therein. The drive shaft 80 drives the motion of a rotatable assembly 15 of the flow control assembly 14 comprising the rotary disc 40, the biasing seal 55, and drive shaft 80 (including the integrated flow chamber 95 formed therein), which all rotate in unison relative to the fixed disc 20 of the flow control assembly 14. The fixed disc 20 is affixed in position both rotationally and axially within the valve housing 60, hence the rotatable assembly 15 rotates relative to each of the valve housing 60 and the fixed disc 20 received therein. The rotation of the rotatable assembly 15 relative to the fixed disc 20 and the valve housing 60 facilitates a switching of a mode of operation of the rotary valve 10 between the different operational modes thereof, as elaborated on hereinafter in greater detail.

As shown, the valve housing 60 may include a pair of fluid inlets 16a, 16b and a pair of fluid outlets 18a, 18b. Each of the fluid inlets 16a, 16b may be in fluid communication with the at least one fluid source and each of the fluid outlets 18a, 18b may be in fluid communication with the at least one fluid destination. It is understood that the valve housing 60 may include more or less inlets 16a, 16b, and more or less outlets 18a, 18b than shown, as desired, while remaining within the scope of the present invention. It is further understood that each of the fluid inlets 16a, 16b may be in fluid communication with the same fluid source or separate and distinct fluid sources and each of the fluid outlets 18a, 18b may be in fluid communication with the same fluid destination or separate and distinct fluid destinations.

The rotary valve 10 as shown and described herein may also be utilized for any number of different applications and for selectively conveying any variety of different fluids therethrough. As one example, the rotary valve 10 may be a bypass, diverter, or switching valve as utilized in controlling a flow of a liquid coolant of an automotive-based coolant fluid system from two upstream-arranged flow paths to two downstream-arranged flow paths. However, it should be readily apparent that the presently disclosed rotary valve 10 may be utilized in substantially any automotive or vehicular application corresponding to the described flow configurations through the rotary valve 10, including the control of various fluids associated with operation of a hydraulic system, a pneumatic system, a fuel system, or a heating, ventilating, and air conditioning (HVAC) system of the associated vehicle, or the like. In addition to a liquid coolant, the fluids suitable for use with the rotary valve 10 may be air, any hydraulic fluids, any types of fuel, or any refrigerants typically utilized with respect to such vehicular systems, as desired. However, it should also be apparent that the present rotary valve 10 may be adapted for use with any fluid associated with any fluid conveying system without necessarily departing from the scope of the present invention, and is therefore not limited to automotive or vehicular applications.

In an exemplary embodiment, the valve housing 60 may include a first inlet 16a for receiving a first fluid from a first fluid source, a second inlet 16b for receiving a second fluid from a second fluid source, a first outlet 18a for distributing one of the first fluid or the second fluid to a first fluid destination, and a second outlet 18b for distributing one of the first fluid or the second fluid to a second fluid destination. However, it should be readily apparent to one skilled in the art that the flow configurations disclosed as occurring from each of the inlets 16a, 16b to each of the outlets 18a, 18b may alternatively include a flow in the opposing direction from one of the identified outlets 18a, 18b to one of the identified inlet 16a, 16b while remaining consistent with the present disclosure. As another example, the rotary valve 10 may include a switching capability wherein one of the identified inlets 16a, 16b is switched to act as an outlet for certain modes of operation, and/or where one of the outlets 18a, 18b is switched to act as an inlet for certain modes of operation, as desired, while remaining within the scope of the present invention.

As shown in FIGS. 1, 2, and 6-9, the valve housing 60 may include an opening 67 defined by a substantially cylindrical circumferential wall 69, a cover 63 removably coupled to the valve housing 60 at a first axial end 61 of the circumferential wall 69, and an axial end wall 68 formed at a second axial end 62 of the circumferential wall 69 disposed opposite the cover 63. However, it should be appreciated that the opening 67 may have any size and shape, as desired, to provide a desired flow of the one or more fluids therethrough while accommodating the flow control assembly 14 therein.

The cover 63 includes an opening 64 formed therethrough along the central axis of the valve housing 60 that is configured to receive an actuator engagement stem 91 of the drive shaft 80 therethrough. The cover 63 may be removably coupled to a rim of the valve housing 60 with an intervening sealing element (not shown) compressed therebetween, such as by utilizing threaded fasteners for urging the cover 63 towards the rim of the valve housing 60. Any configuration of the cover 63 relative to the valve housing 60 that provides a fluid-tight seal may be utilized without departing from the scope of the present invention.

One or more O-rings or other gaskets 66 may be received between an inner circumferential surface of the cover 63 defining the opening 64 (shown and identified in FIG. 6) thereof and an outer circumferential surface of the drive shaft 80 to form a fluid-tight seal therebetween, including during periods of rotation of the drive shaft 80 relative to the valve housing 60. A chamber having the gaskets 66 disposed therein may be partially defined by an annular shoulder of the cover 63 formed along the opening 64 thereof at a first axial end of the chamber and an annular shoulder 65 of the drive shaft 80 at a second axial end of the chamber. However, alternative sealing arrangements may be present between the drive shaft 80 and the valve housing 60 while remaining within the scope of the present invention, hence the described configuration is not limiting to the present invention.

The opening 67 may be in fluid communication with each of the inlets 16a, 16b and each of the outlets 18a, 18b. In certain embodiments, the first inlet 16a is in fluid communication with the opening 67 through an aperture 67a formed in the circumferential wall 69, and the second inlet 16b and each of the outlets 18a, 18b are in fluid communication with the opening 67 through respective apertures 67b, 67c, 67d formed in the axial end wall 68. As such, the flow of the first fluid into the opening 67 via the first inlet 16a may be substantially perpendicular to the flow of the second fluid into the opening 67 via the second inlet 16b and the flow of the first and second fluids out of the opening 67 via each of the outlets 18a, 18b. That is, the flow of the first fluid into the opening 67 through the aperture 67a may be transverse to the axial direction of the valve housing 60, which extends between the cover 63 and the axial end wall 68 thereof. This configuration may include the flow of the first fluid being perpendicular to the axial direction and/or extending radially through a central axis of the valve housing 60 when passing across the aperture 67a, wherein the aperture 67a corresponds to a boundary fluidly coupling an interior of the first inlet 16a to the opening 67. In contrast, the flow through each of the inlet 16b and the outlets 18a, 18b may be substantially parallel to the axial direction of the valve housing 60 when passing through each of the respective apertures 67b, 67c, 67d formed through the axial end wall 68 and leading towards one of the inlet 16b or the outlets 18a, 18b. Specifically, an aperture 67b corresponds to a boundary fluidly coupling the second inlet 16b to the opening 67, an aperture 67c corresponds to a boundary fluidly coupling the first outlet 18a to the opening 67, and an aperture 67d corresponds to a boundary fluidly coupling the second outlet 18b to the opening 67.

Figure 2:
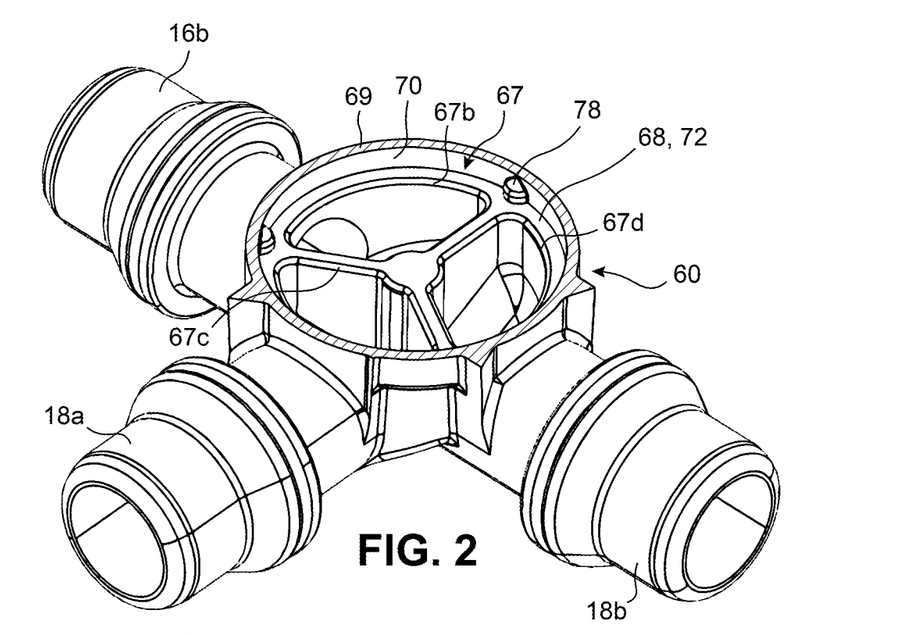
FIG. 2 is a cross-sectional view of the rotary valve of FIG. 1 taken along section line 2-2 shown in FIG. 1.
Figure 3:
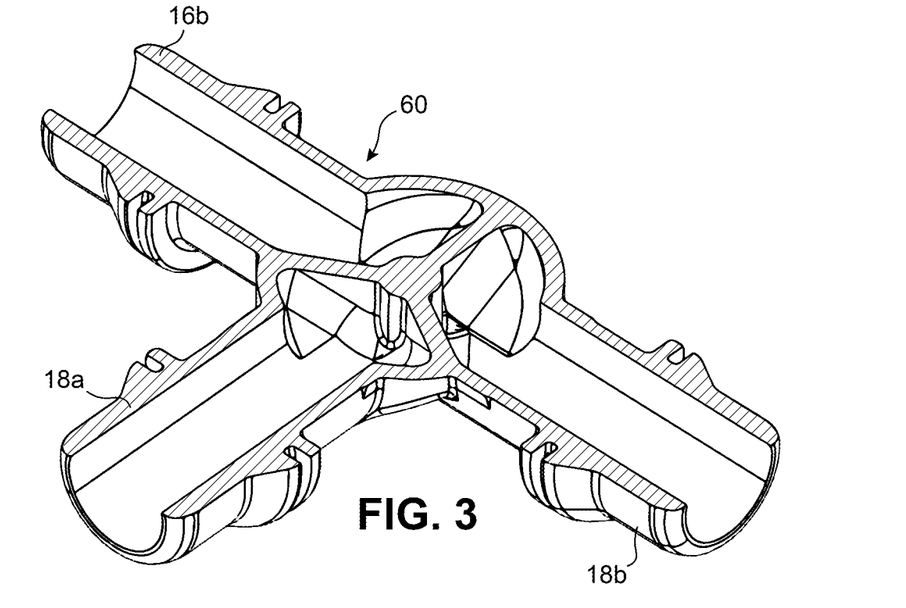
FIG. 3 is a cross-sectional view of the rotary valve of FIG. 1 taken along section line 3-3 shown in FIG. 1.

As shown in FIG. 1, the aperture 67a is formed along an inner circumferential surface 70 of the circumferential wall 69 and may be substantially circular or elliptical in shape. As best shown in FIGS. 2 and 3, the aperture 67b corresponding to the second inlet 16b is formed along an inner surface 72 of the axial end wall 68 at a first position disposed between the axis of rotation of the drive shaft 80 (corresponding to the central axis of the valve housing 60) and a first circumferentially extending segment of the inner circumferential surface 70 of the circumferential wall 69, the aperture 67c corresponding to the first outlet 18a is formed along the inner surface 72 of the axial end wall 68 at a second position disposed between the axis of rotation of the drive shaft 80 and a second circumferentially extending segment of the inner circumferential surface 70, and the aperture 67d corresponding to second outlet 18b is formed along the inner surface 72 of the axial end wall 68 at a third position disposed between the axis of rotation of the drive shaft 80 and a third circumferentially extending segment of the inner circumferential surface 70. The aperture 67c corresponding to the first outlet 18a may be disposed at a position along the inner circumferential surface 70 that is diametrically opposed to the position of the aperture 67a formed therethrough and corresponding to the first inlet 16a. In the present embodiment, each of the apertures 67b, 67c, 67d includes a perimeter shape resembling a sector of a circle, and each of the apertures 67b, 67c, 67d occupies about a third of the circular cross-sectional shape of the axial end wall 68 at the inner surface 72 thereof.

However, alternative configurations of the apertures 67b, 67c, 67d may be utilized through the axial end wall 68 for selectively communicating the fluid to a desired one or combination of the inlet/outlets 16b, 18a, 18b, so long as the apertures 67b, 67c, 67d are positioned for receiving a desired distribution of the fluid passing through the rotary valve 10 based on the instantaneous rotational position of the rotatable assembly 15 relative to the fixed disc 20, as explained hereinafter. The valve housing 60 may accordingly include an inner surface, as defined by the inner circumferential surface 70 of the circumferential wall 69 and the inner surface 72 of the axial end wall 68, that defines each of the opening 67, the aperture 67a, the aperture 67b, the aperture 67c, and the aperture 67d, wherein each of the apertures 67a, 67b, 67c, 67d forms a boundary into or out of the opening 67.

The second inlet 16b and each of the outlets 18a, 18b may include a ninety-degree bend formed therein at positions spaced axially from the respective apertures 67b, 67c, 67d thereof, as more clearly depicted in FIGS. 6-9. However, the inlet 16b and the outlets 18a, 18b may alternatively be provided in the absence of such ninety-degree bends, and may instead extend away from the valve housing 60 at any angle or configuration, including exclusively axially, so long as each of the inlet 16b and the outlets 18a, 18b is in fluid communication with the opening 67 via a corresponding one of the apertures 67b, 67c, 67d formed through the axial end wall 68.

As best shown in FIG. 2, the axial end wall 68 of the valve housing 60 further includes at least one locating structure 78 extending axially from the inner surface 72 thereof for establishing the fixed position of the fixed disc 20 relative to the valve housing 60, and more specifically for providing a structural feature that is not axially symmetric relative to the axis of rotation of the drive shaft 80 such that the fixed disc 20 cannot undesirably rotate relative to the valve housing 60 about a central axis of the fixed disc 20 substantially aligned axially with the axis of rotation of the drive shaft 80. Each of the locating structures 78 also extends radially inwardly from the otherwise cylindrical shape of the inner circumferential surface 70 at a position where the inner circumferential surface 70 meets the axial end wall 68.

The fixed disc 20 is substantially cylindrical in shape and includes a first face 23, an opposing second face 24, and an outer circumferential surface 25 connecting the first face 23 to the second face 24 with respect to the axial direction of the drive shaft 80. The outer circumferential surface 25 includes a shape and size corresponding to a cylindrically shaped portion of the inner circumferential surface 70 of the circumferential wall 69, and at least one locating segment 27 with each of the locating segments 27 having a shape and size corresponding to one of the locating structures 78 of the valve housing 60. Each of the locating segments 27 is provided as a radially inwardly extending indentation formed in the circumferential surface 25 having the same configuration as a shoulder of each of the corresponding locating structures 78.

The first face 23, which may alternatively be referred to as the first axial end surface 23 of the fixed disc 20, is arranged to face outwardly towards the first end 61 of the valve housing 60, whereas the second face 24, which may alternatively be referred to as the second axial end surface 24 of the fixed disc 20, is arranged to face outwardly towards the second end 62 of the valve housing 60. The first face 23 and the second face 24 are arranged parallel to each other, and each face 23, 24 is planar in configuration. The plane of each face 23, 24 is arranged to be substantially perpendicular to the axis of rotation of the drive shaft 80. The first face 23 is configured to face towards and engage a face of the rotary disc 40 while the second face 24 may be configured to face towards and sealingly engage a sealant, gasket, or other sealing means disposed on the inner surface 72 of the axial end wall 68 around a perimeter of each of the apertures 67b, 67c, 67d. The outer circumferential surface 25 of the fixed disc 20 is fitted to the inner circumferential surface 70 of the valve housing 60 with the cylindrical surfaces thereof axially aligned with corresponding cylindrical portions of the inner circumferential surface 70 and each of the locating segments 27 axially aligned with a corresponding one of the locating structures 78.

The fixed disc 20 further includes a first flow opening 31, a second flow opening 32, and a third flow opening 33 formed therethrough from the first face 23 to the second face 24 thereof. Each of the flow openings 31, 32, 33 accordingly provides fluid communication between the first face 23 and the second face 24 of the fixed disc 20. The first flow opening 31 is axially aligned with the aperture 67b, the second flow opening 32 is axially aligned with the aperture 67c, and the third flow opening 33 is axially aligned with the aperture 67d.

The first flow opening 31 includes a peripheral shape that substantially corresponds to and is axially aligned with that of the aperture 67b, the second flow opening 32 includes a peripheral shape that substantially corresponds to and is axially aligned with that of the aperture 67c, and the third flow opening 33 includes a peripheral shape that substantially corresponds to and is axially aligned with that of the aperture 67d. In the present embodiment, each of the flow openings 31, 32, 33 includes a perimeter shape resembling a truncated sector of a circle, wherein a radial inner portion of the perimeter is truncated in an arcuate shape having a constant radius of curvature relative to the axis of rotation of the drive shaft 80. In the present embodiment, each of the flow openings 31, 32, 33 occupies about a third of the circular cross-sectional shape of the fixed disc 20 while extending angularly through an angle of about 120° relative to the axis of rotation of the drive shaft 80, but alternative configurations of the flow openings 31, 32, 33 may be utilized through the fixed disc 20 for selectively communicating the first and second fluids therethrough while remaining within the scope of the present invention.

The fixed disc 20 includes a shaft receiving indentation 34 formed in the first face 23 thereof and extending towards the second face 24 thereof. The shaft receiving indentation 34 is cylindrical in shape and includes a depth with respect to the axial direction of the drive shaft 80 sufficient to provide an axial clearance between a base surface of the shaft receiving indentation 34 and a distal end of the drive shaft 80. The cylindrical shape of the shaft receiving indentation 34 may be centered relative to the axis of rotation of the drive shaft 80.

The rotary disc 40 is substantially cylindrical in shape and includes a first face 41, an opposing second face 42, and an outer circumferential surface 44 connecting the opposing faces 41, 42 with respect to the axial direction of the drive shaft 80. As best shown in FIG. 1, the outer circumferential surface 44 is divided into a cylindrical segment 45 having a shape and size corresponding to a cylindrically shaped portion of the inner circumferential surface 70 of the circumferential wall 69 and a flow passage segment 46 having a shape and size substantially corresponding to any one of the flow openings 31, 32, 33 formed through the fixed disc 20. Specifically, the flow passage segment 46 is provided as a radially inwardly indented portion of the outer circumferential surface 44 forming an outer flow passage 47 of the rotary disc 40 providing fluid communication between the opposing faces 41, 42 thereof along a periphery of the rotary disc 40.

The outer flow passage 47 of the presently disclosed embodiment is defined by an open space formed between the inner circumferential surface 70 of the valve housing 60 and the flow passage segment 46 of the outer circumferential surface 44, which results in the outer flow passage 47 having the shape of a radially inwardly truncated sector of a circle in similar fashion to each of the flow openings 31, 32, 33. The outer flow passage 47 may extend angularly around the axial direction of the drive shaft 80 about 120° to correspond to about a third of a cross-section of the opening 67 at the axial position of the rotary disc 40. However, it should be readily apparent that substantially any shape and configuration of the outer flow passage 47 may be provided around the rotary disc 40 so long as the resulting outer flow passage 47 is able to be selectively placed in fluid communication with a desired one of the flow openings 31, 32, 33 formed through the fixed disc 20. For example, instead of including a radially inwardly extending indentation for forming the open space defining the outer flow passage 47, the outer flow passage 47 may instead be provided as a through-hole or opening passing from the first face 41 to the opposing second face 42 of the rotary disc 40, including having the same general shape and configuration of either of the disclosed flow openings 31, 32, 33 of the fixed disc 20.

A shaft receiving opening 48 is formed through the rotary disc 40 at a position axially aligned with the drive shaft 80 to allow for passage of the drive shaft 80 through the rotary disc 40 from the first face 41 to the opposing second face 42 thereof. The shaft receiving opening 48 may include substantially any axially non-symmetric shape for transferring rotational motion from a disc engagement stem 92 of the drive shaft 80 to the rotary disc 40 via engagement between an outer circumferential surface of the disc engagement stem 92 and an inner circumferential surface of the rotary disc 40 defining the shaft receiving opening 48.

The rotary disc 40 further includes an inner flow passage 49 formed therethrough from the first face 41 to the second face 42 thereof, thereby allowing the inner flow passage 49 to provide fluid communication between the opposing faces 41, 42 of the rotary disc 40 along an interior thereof. The inner flow passage 49 extends angularly about 240° around a central portion of the rotary disc having the shaft receiving opening 48 disposed therein to correspond to the inner flow passage 49 being axially aligned with any two of the flow openings 31, 32, 33 formed through the fixed disc 20, and hence any two of the apertures 67b, 67c, 67d formed along the inner surface 72 of the axial end wall 68. The inner flow passage 49 accordingly occupies about two-thirds of a cross-section of the opening 67 at the axial position of the rotary valve 40.

The fixed disc 20 and the rotary disc 40 may each be formed from a ceramic material having a relatively low co-efficient of friction and a correspondingly high resistance to wear when the discs 20, 40 are caused to move relative to each other when the opposing faces 23, 42 thereof are placed in contact with each other. The ceramic material may also include a relatively low coefficient of thermal expansion to prevent excessive deformation of either of the discs 20, 40 when exposed to varying temperatures, such as when the fluid passing through the rotary valve 10 varies in temperature. The ceramic material may also be selected such that the engaging faces 23, 42 can be precision-machined to be planar in configuration such that the facing engagement of the faces 23, 42 prevents the flow of a fluid therebetween. A fluid-tight seal may accordingly be formed directly between the engaging faces 23, 42 of the discs 20, 40 absent the intervention of any form of additional sealing element, O-ring, gasket, or the like, due to the planar face-to-face engagement present between the faces 23, 42.

The discs 20, 40 may alternatively be formed from a first material that is coated at certain surfaces with a second material. The second material may be disposed at those surfaces configured to make sliding engagement with another surface, such as along the engaging faces 23, 42, or along the outer circumferential 44 surface of the rotary disc 40. The second material may be the ceramic material as described above. The second material may alternatively be a diamond material or a diamond-like carbon (DLC) material. The second material may alternatively be a lubricant, such as a water-insoluble lubricant. The faces 23, 42 and/or the outer circumferential surface 44 of the rotary disc 40 may include any combination of any of the materials and coatings as described herein while remaining within the scope of the present invention, so long as the facing engagement present between the outwardly exposed faces 23, 42 is utilized to provide a seal therebetween in the manner described herein.

The drive shaft 80 includes the actuator engagement stem 91 disposed at a first end thereof and the disc engagement stem 92 disposed at an opposing second end thereof. As shown partially schematically in FIG. 6, the actuator engagement stem 91 extends outside of the cover 63 for engagement with a corresponding structure of a rotary actuator 150 configured to selectively rotate the drive shaft 80 about the axis of rotation thereof. More specifically, the engagement stem 91 is shown as having an axially non-symmetric actuator engagement portion having a shape configured to mate with a correspondingly shaped axially non-symmetric opening (not shown) of the rotary actuator 150 for transferring torque from the rotary actuator 150 to the drive shaft 80. However, it should be readily understood that any form of mechanical connection facilitating the selective rotation of the drive shaft 80 via actuation of the rotary actuator 150 may be utilized while remaining within the scope of the present invention. The rotary actuator 150 may be any form of rotary actuator 150 suitable for providing the torque necessary to cause the rotation of the rotary disc 40 relative to the fixed disc 20 via a transfer of the rotation of the drive shaft 80 to the rotary disc 40. The rotary actuator 150 may be a torque motor, a servo motor, an electric stepper motor, or a brushless DC motor, as non-limiting examples.

An outer circumferential surface of the disc engagement stem 92 includes a cross-sectional shape substantially corresponding to that of the inner circumferential surface of the shaft receiving opening 48 of the rotary disc 40 to allow the disc engagement stem 92 to extend through the rotary disc 40 in an axially non-symmetric manner facilitating a transfer of rotation of the drive shaft 80 about the axis of rotation thereof to the rotary disc 40 such that the drive shaft 80 and the rotary disc 40 rotate in unison and maintain the same structural configuration relative to one another during rotation of the drive shaft 80. However, there may be a slight clearance present between the facing inner and outer circumferential surfaces of the drive shaft 80 and the rotary disc 40 to allow for some limited play therebetween to accommodate any minor axial misalignments thereof, as desired.

Figure 4:
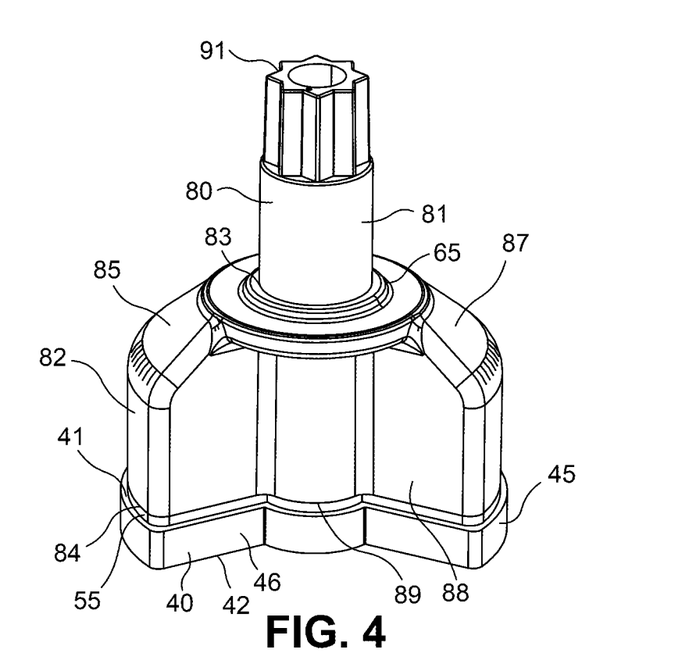
FIG. 4 is a front perspective view of an integrated drive shaft and flow chamber of the rotary valve shown in isolation.
Figure 5:
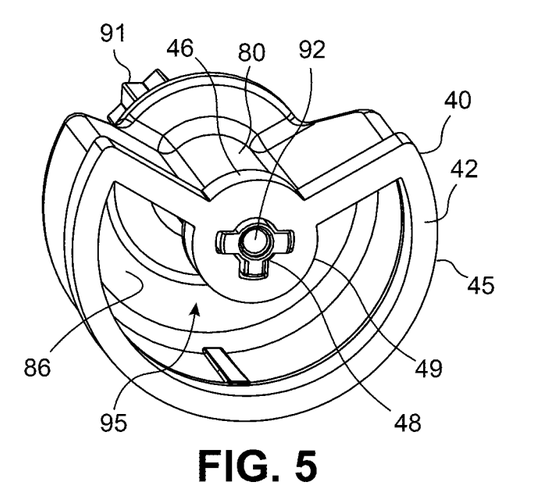
FIG. 5 is a bottom perspective view of the integrated drive shaft and flow chamber of FIG. 4.

As shown in FIG. 4, the drive shaft 80 includes a central shaft 81 and a flow control wall 82 extending radially outwardly from an outer circumferential surface of the central shaft 81 at a position intermediate the actuator engagement stem 91 and the disc engagement stem 92 thereof. More specifically, the flow control wall 82 includes a first end 83 where the flow control wall 82 extends radially outwardly from the outer circumferential surface of the central shaft 81 at a position immediately adjacent an inwardly facing surface of the cover 63 disposed at an axial end of the opening 67. The previously described annular shoulder 65 may be formed at the first end 83 of the flow control wall 82. The flow control wall 82 extends away from the first end 83 thereof in an axial direction of the drive shaft 80 towards the second end 62 of the valve housing 60, and the flow control wall 82 terminates at a second end 84 thereof. The flow control wall 82 also extends radially outwardly along at least one tapered segment thereof as the flow control wall 82 progresses axially from the first end 83 to the second end 84 thereof to cause the second end 84 to correspond substantially in shape and size to the rotary disc 40 about a perimeter of the second end 84. The second end 84 of the flow control wall 82 is configured to be planar in configuration and to face towards (and in some embodiments engage) the first face 41 of the rotary disc 40 about the perimeter thereof. The flow control wall 82 accordingly forms a skirt-like structure depending from the central shaft 81 of the drive shaft 80 and expanding radially outwardly from the outer circumferential surface of the central shaft 81 to a perimeter shape substantially corresponding to that of the rotary disc 40.

The flow control wall 82 includes an outer surface 85 facing towards the inner circumferential surface 70 of the circumferential wall 68 and an inner surface 86 facing towards the axis of rotation of the drive shaft 80, which in the present embodiment corresponds to facing towards an interior disposed segment of the outer circumferential surface of the central shaft 81. The outer surface 85 is divided into a circumferential flow surface 87 and an axial flow surface 88. The circumferential flow surface 87 may be formed by substantially axially-symmetric surfaces, such as the illustrated cylindrical and frustoconical surfaces forming the circumferential flow surface 87 in the present figures, that are indented radially inwardly relative to the inner circumferential surface 70 of the circumferential wall 69 to allow for either of the first or the second fluid to flow circumferentially around an exterior of the flow control wall 82 when flowing towards the axial flow surface 88. The axial flow surface 88 includes a first radial surface of the flow control wall 82 extending radially inwardly from a first end of the circumferential flow surface 87, a second radial surface of the flow control wall 82 extending radially inwardly from an opposing second end of the circumferential flow surface 87, and an exterior disposed segment of the outer circumferential surface of the drive shaft 80 disposed between the first and second radial surfaces. The axial flow surface 88 is indented radially inwardly relative to the circumferential flow surface 87 to promote a flow of the first or second fluid from flowing circumferentially around the circumferential flow surface 87 to flowing axially along and past the axial flow surface 88. The axial flow surface 88 may be indented to include the same cross-sectional shape as the outer flow passage 47 of the rotary disc 40. That is, the axial flow surface 88 may be indented to result in the formation of an axial flow pathway 89 at the second end 84 of the flow control wall 82 between the axial flow surface 88 and the inner circumferential surface 70 having the shape of a radially inwardly truncated sector of a circle in similar fashion to each of the flow openings 31, 32, 33 and the outer flow passage 47. The axial flow pathway 89 may extend angularly around the axial direction of the drive shaft 80 about 120° to correspond to about a third of a cross-section of the opening 67 at the axial position of the second end 84 of the flow control wall 82. The axial flow pathway 89 of the drive shaft 80 may be shaped and dimensioned to substantially correspond in shape and size to one of the flow openings 31, 32, 33, and/or one of the apertures 67*b*, 67*b*, 67*c*, and/or the outer flow passage 47.

The flow chamber 95 integrated into the drive shaft 80 is defined by the inner surface 86 of the flow control wall 82 and extends circumferentially around the axis of rotation of the drive shaft 80 about 240° to correspond to about two-thirds of the cross-section of the opening 67 at the axial position of the second end 84 of the flow control wall 82. A shape and size of the flow chamber 95 at the second end 84 of the flow control wall 82 may substantially correspond to a shape and size of the inner flow passage 49 of the rotary disc 40. In the present embodiment, the flow chamber 95 is also partially defined by an interior disposed segment of the outer circumferential surface of the drive shaft 80, but such a configuration is not necessary to prescribe the desired flow through the flow chamber 95 in accordance with the present disclosure. The flow chamber 95 tapers outwardly from a minimized radius at the first end 83 of the flow control wall 82 to a maximized radius at the second end 84 in accordance with the outward tapering of the inner surface 86 towards the second end 84.

As can be seen throughout FIGS. 6-9, a combined flow area through the opening 67 between the outer surface 85 of the flow control wall 82 and the inner circumferential surface 70 of the valve housing 60 to each of the opposing sides of the flow control wall 82, with respect to a circumferentially flowing fluid that is divided to flow around the flow control wall 82 in each of two opposing circumferential directions, may be substantially similar or equal to a flow area through the flow chamber 95 between the inner surface

86 of the flow control wall 82 and the outer circumferential surface of the central shaft 81, similarly with respect to a circumferential flowing fluid, but only a single flow in a single circumferential direction. That is, the flow control wall 82 is tapered between the first and second ends 83, 84 thereof to result in a divided flow of the fluid through two relatively smaller and diametrically opposing portions of the opening 67 disposed around the flow control wall 82 that is substantially equal to a single flow of the fluid through a relatively larger flow chamber 95 of the flow control wall 82.

The use of such similar flow areas may beneficially result in the rotary valve 10 having a substantially similar effect with regards to a pressure drop experienced when one of the first fluid or the second fluid switches from flowing around the flow control wall 82 to flowing within the flow chamber 95 defined by the flow control wall 82. That is, neither of the possible flow paths for either of the fluids relative to the drive shaft 80 includes an excessive expansion or constriction of flow therethrough relative to the other, hence neither of the possible flow paths is expected to have an unusually noticeable impact on the characteristics of the fluid flowing therethrough in comparison to the other possible flow path. The rotary valve 10 may accordingly be operable in any of a number of different flow configurations without the switching between such flow configurations resulting in an undesirably large drop in pressure of one of the corresponding fluids when switching from one flow configuration to another as facilitated by the structure of the disclosed rotary valve 10. In some embodiments, a circumferential flow area through the flow chamber 95 may be about 90-110% of a circumferential flow area around an exterior of the flow control wall 82 along two opposing cylindrical segments of the inner circumferential surface 70. In other embodiments, a circumferential flow area through the flow chamber 95 may be about 80-120% of a circumferential flow area around an exterior of the flow control wall 82 along two opposing cylindrical segments of the inner circumferential surface 70. In yet other embodiments, a circumferential flow area through the flow chamber 95 may be about 70-130% of a circumferential flow area around an exterior of the flow control wall 82 along two opposing cylindrical segments of the inner circumferential surface 70.

The biasing seal 55 is disposed axially between the second end 84 of the flow control wall 82 and the first face 41 of the rotary disc 40. In the illustrated embodiment, the biasing seal 55 is disposed directly between the second end 84 of the flow control wall 82 and the first face 41 of the rotary disc 40 such that the flow control wall 82 and the rotary disc 40 are not in direct contact with one another, but are instead engaging and compressing opposing faces of the biasing seal 55. In other embodiments, the biasing seal 55 may be disposed within a seal retaining groove (not shown) indented axially into the planar second end 84 of the flow control wall 82 or axially into the first face 41 of the rotary disc 40. When received in such a seal retaining groove, the biasing seal 55 may include any suitable cross-sectional shape so long as the biasing seal 55 is dimensioned axially to include an axial height that is greater than an axial height of the seal retaining groove, thereby ensuring compression of the biasing seal 55 despite contact being present between the flow control wall 82 and the rotary disc 40. The biasing seal 55 is shown in FIG. 1 as having the same configuration as the first face 41 of the rotary disc 40 on which the biasing seal 55 rests, hence the biasing seal 55 defines the same flow openings therethrough and therearound as described with reference to the rotary disc 40. The biasing seal 55 is accordingly positioned to always be compressed axially between the second end 84 and the first face 41 about a perimeter of the inner flow passage 49 formed through the rotary disc 40 while fluidly separating the inner flow passage 49 from the outer flow passage 47. The biasing seal 55 forms a fluid-tight seal between the flow control wall 82 and the rotary disc 40 preventing the flow of a fluid therebetween.

The biasing seal 55 also performs a secondary function in that the biasing seal 55 aids in maintaining a desired sealing force between the first face 23 of the fixed disc 20 and the second face 42 of the rotary disc 40. The biasing seal 55 may be formed from an elastomeric or otherwise resiliently compressible material capable of applying a reactive force to each of the drive shaft 80 and the rotary disc 40 in the outward axial directions of the biasing seal 55 in reaction to the biasing seal 55 being compressed and elastically deformed in the inward axial directions thereof. The biasing seal 55 is configured to be normally compressed between the flow control wall 82, which may be formed integrally (monolithically) with the remainder of the drive shaft 80, and the first face 41 of the rotary disc 40 when the drive shaft 80 is in an installed operational position relative to the corresponding rotary actuator 150. This normally occurring inward compression of the biasing seal 55 in the axial direction of the drive shaft 80 results in the biasing seal 55 applying an axially extending reactive force in a direction towards the rotary disc 40, which in turn causes the second face 42 of the rotary disc 40 to be normally in contact with and sealingly engaging the first face 23 of the fixed disc 20, which is in turn delimited from further axial motion by the axial end wall 68 of the valve housing 60.

The normal compression of the biasing seal 55 in the axial direction accordingly results in an ability to maintain the desired sealing contact force between the opposing faces 23, 42 in the absence of the need for an additional spring or other biasing element normally pressing against the flow control wall 82 in an axial direction towards the fixed disc 20, such as disposing a normally compressed spring between the cover 63 and a facing surface of the flow control wall 82, or another flanged or otherwise radially extending surface of the drive shaft 80. However, the present invention is not necessarily limited to the use of the biasing seal 55, as a spring or other biasing element as described may be utilized in the described configuration without necessary departing from the scope of the present invention. If such a spring is utilized, the biasing seal 55 may not be necessary to form the seal between the flow control wall 82 and the rotary disc 40, and such components may instead be removably or non-removably joined to one another, or integrally (monolithically) formed with one another, to include the same structure as disclosed by the assembly of the drive shaft 80 and the rotary disc 40.

The flow chamber 95 formed within the flow control wall 82 is configured to always be axially aligned with and fluidly coupled to the inner flow passage 49 formed through the rotary disc 40 regardless of the rotational position of the rotatable assembly 15 comprising the drive shaft 80, the rotary disc 40, and the biasing seal 55. The inner flow passage 49 of the rotary disc 40 is in turn configured to selectively fluidly couple the flow chamber 95 of the drive shaft 80 with a corresponding pair of the three flow openings 31, 32, 33 formed through the fixed disc 20, depending on the instantaneous rotational position of the rotatable assembly 15 according to the modes of operation disclosed with respect to the present invention. Each of the pairs of the flow openings 31, 32, 33 aligned with the inner flow passage 49 is in turn associated with a corresponding pair of the apertures 67b, 67c, 67d leading to one of the inlets/outlets 16b, 18a, 18b, hence the inner flow passage 49 of the rotary disc 40 may be said to fluidly couple the flow chamber 95 to a pair of the apertures 67b, 67c, 67d or to a pair of the inlets/outlets 16b, 18a, 18b.

The outer flow passage 47 of the rotary disc 40 is configured to always be fluidly coupled to a portion of the opening 67 disposed radially outwardly of the flow control wall 82, whether by way of the circumferential flow surface 87 or the axial flow surface 88 of the flow control wall 82, to cause the outer flow passage 47 to always be fluidly coupled to the outer surface 85 of the flow control wall 82, the aperture 67a, and the corresponding first inlet 16a. The axial flow pathway 89 disposed radially outwardly of the flow control wall 82 at the boundary between the second end 84 thereof and the first face 41 of the rotary disc 40 may also be said to always fluidly couple the outer flow passage 47 of the rotary disc 40 to the outer surface 85, the aperture 67a, and the corresponding first inlet 16a. The outer flow passage 47 is also configured to fluidly couple the flow space disposed between the flow control wall 82 and the circumferential wall 69 to one of the flow openings 32, 33 corresponding to one of the outlets 18a, 18b, depending on the selected mode of operation of the rotary valve and the corresponding rotational position of the rotatable assembly 15 relative to the fixed disc 20 and the valve housing 60.

The rotary valve 10 generally operates as follows. The rotary actuator 150 is configured to control the rotational position of the drive shaft 80 relative to the valve housing 60 and the fixed disc 20 via an appropriate transfer of torque from the rotary actuator 150 to the actuator engagement stem 91 of the drive shaft 80. The drive shaft 80 rotates in a desired rotational direction as a result of the transfer of the torque thereto, and the rotation of the drive shaft 80 results in a further transfer of torque from the drive shaft 80 to the rotary disc 40 as a result of the axially non-symmetric rotational interference coupling provided therebetween. The rotatable assembly 15 is accordingly driven to rotate relative to the fixed disc 20 and the valve housing 60 to position the flow chamber 95 and the inner flow passage 49 in selective fluid communication with a corresponding pair of the flow openings 31, 32, 33 while the outer flow passage 47 and the axial flow pathway 89 are positioned in selective fluid communication with the remaining one of the flow openings 31, 32, 33 not forming the pair instantaneously aligned with the flow chamber 95 and the inner flow passage 49.

Figure 6:
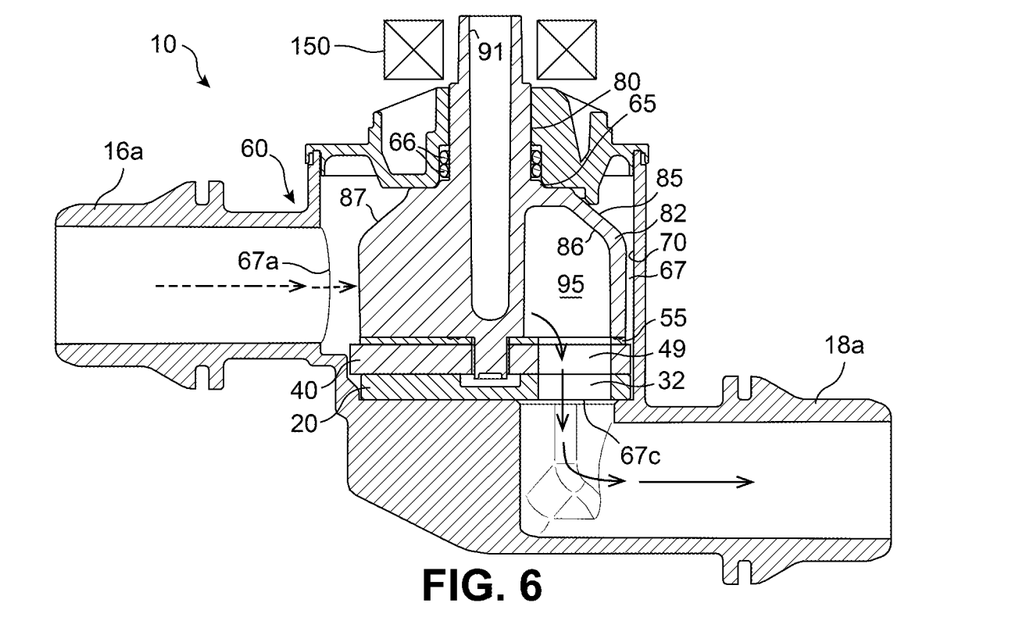
FIG. 6 is a cross-sectional view of the rotary valve of FIG. 1 taken along section line 6-6 shown in FIG. 1, wherein the rotary valve is depicted in a first mode of operation.
Figure 7:
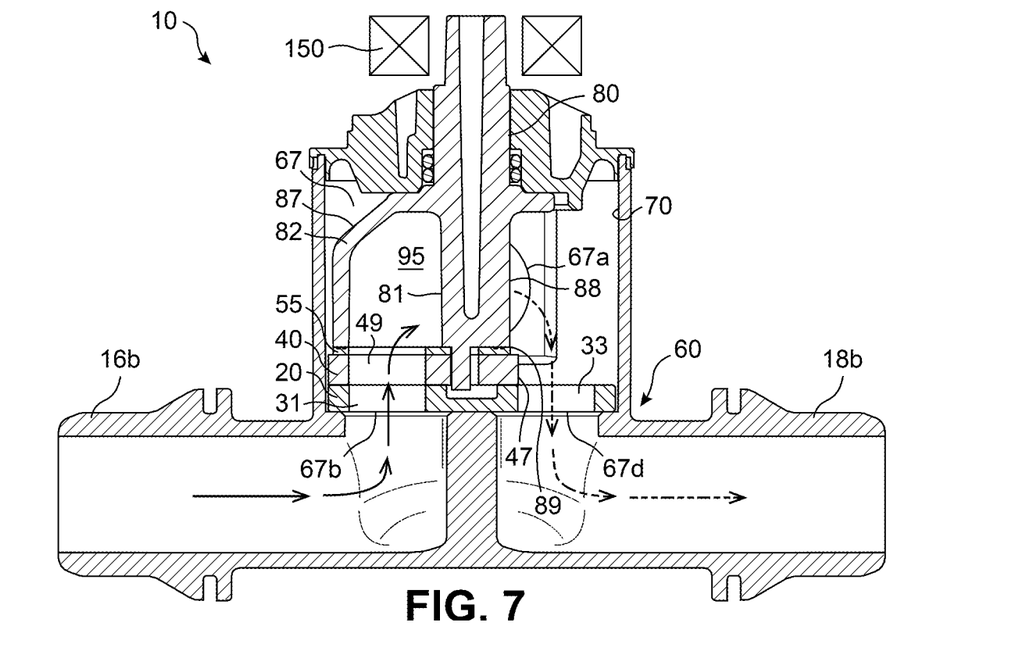
FIG. 7 is a cross-sectional view of the rotary valve of FIG. 1 taken along section line 7-7 shown in FIG. 1, wherein the rotary valve is depicted in the first mode of operation.
Figure 8:
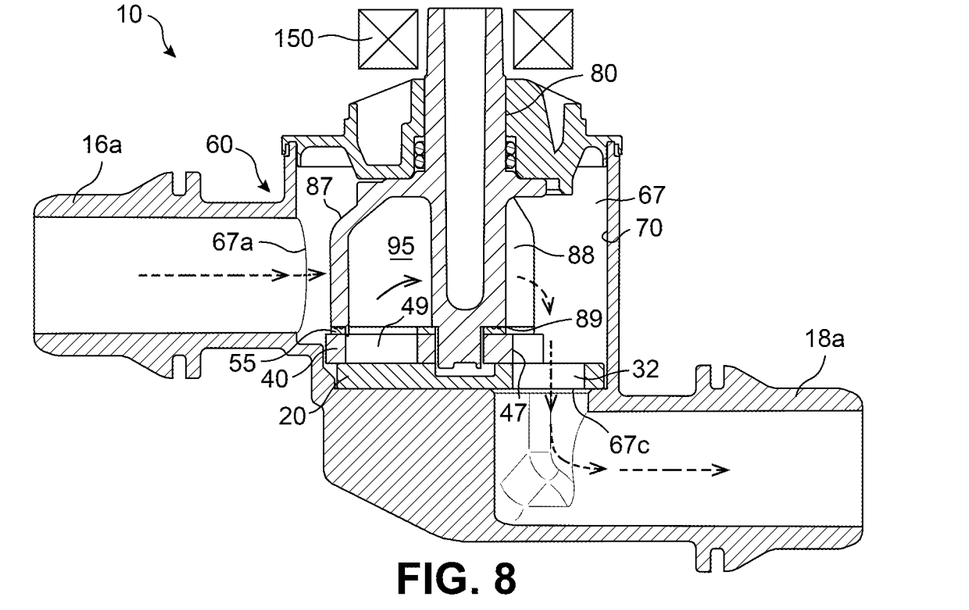
FIG. 8 is a cross-sectional view of the rotary valve of FIG. 1 taken along section line 8-8 shown in FIG. 1, wherein the rotary valve is depicted in a second mode of operation.
Figure 9:
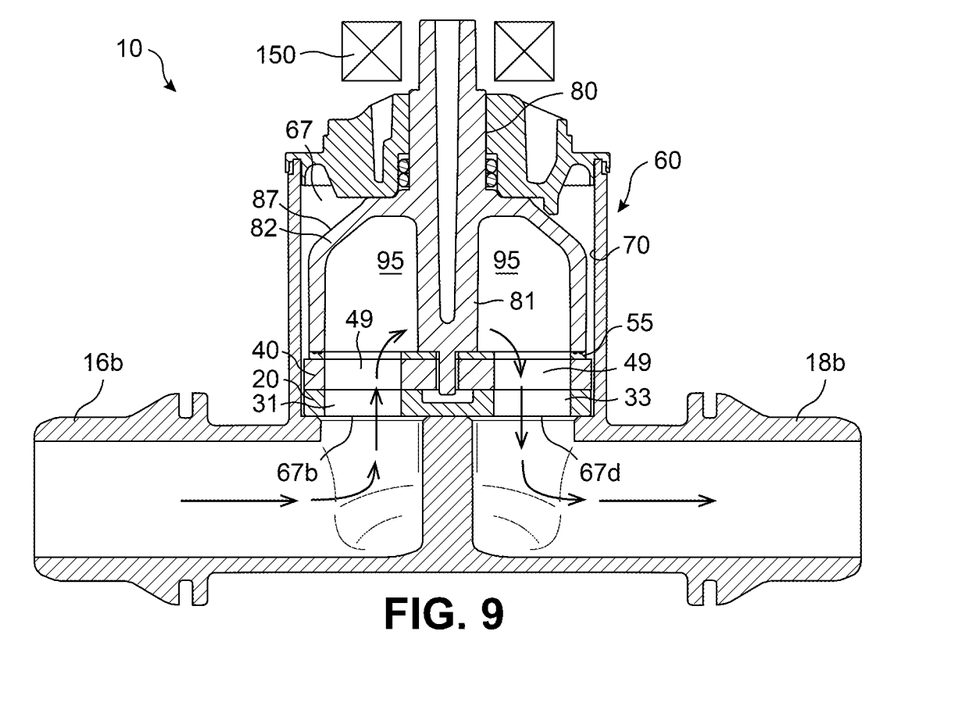
FIG. 9 is a cross-sectional view of the rotary valve of FIG. 1 taken along section line 9-9 shown in FIG. 1, wherein the rotary valve is depicted in the second mode of operation.

FIGS. 6 and 7 illustrate the rotary valve 10 according to a first mode of operation while FIGS. 8 and 9 illustrate the rotary valve 10 according to a second mode of operation. The different modes of operation including a switching of which of the first and second inlets 16a, 16b is in selective fluid communication with the respective first and second outlets 18a, 18b, thereby resulting in two possible modes of operation (assuming the use of two dedicated inlets and two dedicated outlets, as opposed to a bi-directional flow configuration). The first mode of operation includes the rotatable assembly 15 having the same configuration relative to the valve housing 60 as is disclosed in the exploded view of FIG. 1, wherein the flow chamber 95 and the inner flow passage 49 are axially aligned with the first and second flow openings 31, 32 while the outer flow passage 47 and the axial flow pathway 89 are axially aligned with the remaining third flow opening 33. The second mode of operation includes the rotatable assembly 15 being rotated about 120° in what would be the clockwise direction from the slightly overhead perspective of FIG. 1 to reposition the flow chamber 95 and the inner flow passage 49 to be axially aligned with the first and third flow openings 31, 33 while the outer flow passage 47 and the axial flow pathway 89 are axially aligned with the second flow opening 32. The first mode of operation may be said to correspond to a first rotational position of the rotatable assembly 15 and the second mode of operation may be said to correspond to a second rotational position of the rotatable assembly 15, wherein a switching between the modes of operation corresponds to a switching between the first and second rotational positions of the rotatable assembly relative to the valve housing 60 and the fixed disc 20. Throughout FIGS. 6-9, a flow of a first fluid originating from the first inlet 16a is shown in broken-line arrows while a flow of a second fluid originating from the second inlet 16b is shown in solid-line arrows to more easily distinguish the two separate fluid flows.

As shown in FIGS. 6 and 7, the first mode of operation includes the first fluid flowing from the interior of the first inlet 16a across the aperture 67a and into the opening 67 of the valve housing 60 while flowing in a direction perpendicular to the axial direction of the drive shaft 80 and/or valve housing 60. The flow of the first fluid flows circumferentially through the opening 67 around the flow control wall 82 at positions disposed between the circumferential flow surface 87 and the inner circumferential surface 70 of the circumferential wall 69 before flowing axially along the axial flow surface 88 towards the axial flow pathway 89. The flow of the first fluid flows axially across the axial flow pathway 89 at the second end 84 of the flow control wall 82, through the outer flow passage 47 formed radially between the rotary disc 40 and the inner circumferential surface 70, through the third flow opening 33 of the fixed disc 20, and then through the aperture 67d to enter the second outlet 18b. The described pathway of the first fluid during the first mode of operation may be referred to as the first pathway through the rotary valve 10.

The first mode of operation further includes the second fluid flowing from the interior of the second inlet 16b across the aperture 67b and into the first flow opening 31 of the fixed disc 20 while flowing axially towards the first end 61 of the valve housing 60. The second fluid then flows axially through the inner flow passage 49 of the rotary disc 40 towards the first end 61 of the valve housing 60 before entering the flow chamber 95 integrated into the drive shaft 80. The second fluid flows circumferential within the flow chamber 95 before flowing axially towards the second end 62 of the valve housing 60 through the inner flow passage 49 of the rotary disc 40, the second flow opening 32 of the fixed disc 20, and the aperture 67c corresponding to the first outlet 18a. The flow chamber 95 accordingly forms an axial turn-around section of the flow path for the second fluid where the second fluid changes axial flow directions while also flowing circumferentially around the axis of rotation of the drive shaft 80. It should be apparent that at least a portion of the second fluid may flow circumferentially through the inner flow passage 49 while bypassing flow through the flow chamber 95 due to the inner flow passage 49 extending circumferentially along the same angular displacement as the flow chamber 95 while always in fluid communication therewith. The described pathway of the second fluid during the first mode of operation may be referred to as the second pathway through the rotary valve 10.

As shown in FIGS. 8 and 9, the second mode of operation includes the first fluid flowing from the interior of the first inlet 16a across the aperture 67a and into the opening 67 of the valve housing 60 while flowing in a direction perpendicular to the axial direction of the drive shaft 80 and/or valve housing 60. The flow of the first fluid flows circumferentially through the opening 67 around the flow control wall 82 at positions disposed between the circumferential flow surface 87 and the inner circumferential surface 70 of the circumferential wall 69 before flowing axially along the axial flow surface 88 towards the axial flow pathway 89. The flow of the first fluid flows axially across the axial flow pathway 89 at the second end 84 of the flow control wall 82, through the outer flow passage 47 formed radially between the rotary disc 40 and the inner circumferential surface 70, through the second flow opening 32 of the fixed disc 20, and then through the aperture 67c to enter the first outlet 18a. The described pathway of the first fluid during the second mode of operation may be referred to as the third pathway through the rotary valve 10.

The second mode of operation further includes the second fluid flowing from the interior of the second inlet 16b across the aperture 67b and into the first flow opening 31 of the fixed disc 20 while flowing axially towards the first end 61 of the valve housing 60. The second fluid then flows axially through the inner flow passage 49 of the rotary disc 40 towards the first end 61 of the valve housing 60 before entering the flow chamber 95 integrated into the drive shaft 80. The second fluid flows circumferential within the flow chamber 95 before flowing axially towards the second end 62 of the valve housing 60 through the inner flow passage 49 of the rotary disc 40, the third flow opening 33 of the fixed disc 20, and the aperture 67d corresponding to the second outlet 18b. It should once again be apparent that at least a portion of the second fluid may flow circumferentially through the inner flow passage 49 while bypassing flow through the flow chamber 95 due to the inner flow passage 49 extending circumferentially along the same angular displacement as the flow chamber 95 while always in fluid communication therewith. The described pathway of the second fluid during the second mode of operation may be referred to as the fourth pathway through the rotary valve 10.

The first mode of operation accordingly includes the first fluid flowing from the first inlet 16a to the adjacent disposed and perpendicular arranged second outlet 18b and the second fluid flowing from the second inlet 16b to the adjacent disposed and perpendicular arranged first outlet 18a. In contrast, the second mode of operation includes the first fluid flowing from the first inlet 16a to the diametrically opposing and parallel arranged first outlet 18a and the second fluid flowing from the second inlet 16b to the diametrically opposing and parallel arranged second outlet 18b.

The integration of the flow chamber 95 into the drive shaft 80 beneficially reduces a part count and complexity of manufacturing the rotary valve 10. The formation of the flow chamber 95 directly in the structure of the drive shaft 80 also beneficially facilitates an enlargement of the flow area through the flow chamber 95 to prevent the flow chamber 95 forming an undesirable flow restriction to the fluid passing therethrough. The disclosed configuration also facilitates the use of the biasing seal 55 in place of a spring or other biasing element, while the seal 55 also provides the necessary sealing to prevent a mixing between the different flows paths formed through the rotary valve 10.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A rotary disc valve comprising:
   a rotatable assembly including:
      a drive shaft configured to selectively rotate about an axis of rotation thereof, the drive shaft having a central shaft and a flow control wall extending outwardly from the central shaft, the flow control wall including an inner surface and an outer surface, the inner surface of the flow control wall defining a flow chamber within the drive shaft; and
      a rotary disc coupled to the drive shaft and configured to rotate in unison therewith, the rotary disc including an inner flow passage and an outer flow passage formed therethrough, the inner flow passage always axially aligned with and fluidly coupled to the flow chamber of the drive shaft and the outer flow passage always fluidly coupled to the outer surface of the flow control wall; and
   a fixed disc sealingly engaging the rotary disc, the fixed disc including a first flow opening, a second flow opening, and a third flow opening formed therethrough and disposed around the axis of rotation of the drive shaft, wherein the rotatable assembly is rotatably adjustable to a plurality of rotational positions via the selective rotation of the drive shaft about the axis of rotation thereof, wherein each of the rotational positions includes the inner flow passage of the rotary disc fluidly coupling the flow chamber of the drive shaft to a pair of the first flow opening, the second flow opening, and the third flow opening and the outer flow passage of the rotary disc fluidly coupling the outer surface of the flow control wall to a remaining one of the first flow opening, the second flow opening, and the third flow opening not forming the pair fluidly coupled to the inner flow passage.

2. The rotary disc valve of claim 1, wherein the rotatable assembly further comprises a biasing seal configured to apply a biasing force to sealingly engage the rotary disc towards the fixed disc.

3. The rotary disc valve of claim 2, wherein the biasing force is applied to the rotary disc in a direction towards the fixed disc that is perpendicular to the co-planar arrangement present between a face of the rotary disc and a face of the fixed disc.

4. The rotary disc valve of claim 2, wherein the biasing seal is disposed between an end of the flow control wall and a face of the rotary disc.

5. The rotary disc valve of claim 2, wherein the biasing seal extends around a perimeter of the inner flow passage.

6. The rotary disc valve of claim 1, wherein the fixed disc is configured to remain stationary during rotation of the rotatable assembly relative thereto via the selective rotation of the drive shaft about the axis of rotation thereof.

7. The rotary disc valve of claim 1, wherein the fixed disc and the rotary disc are each formed from a ceramic material or each include a face coated with a ceramic material.

8. The rotary disc valve of claim 1, wherein the flow control wall extends from a first end intersecting the central shaft to a second end engaging the rotary disc.

9. The rotary disc valve of claim 8, wherein the flow control wall tapers radially outwardly relative to the axis of rotation of the drive shaft when extending from the first end to the second end.

10. The rotary disc valve of claim 1, wherein a portion of the outer surface of the flow control wall axially aligned with the outer flow passage of the rotary disc is indented radially inwardly.

11. The rotary disc valve of claim 1, wherein the outer flow passage is formed by a radially inwardly indented portion of an outer circumferential surface of the rotary disc.

12. The rotary disc valve of claim 11, wherein the outer flow passage has a shape of a sector of a circle.

13. The rotary disc valve of claim 1, wherein the rotatable assembly and the fixed disc are disposed within an opening of a valve housing.

14. The rotary disc valve of claim 13, wherein an inner surface of the valve housing is spaced apart from the outer surface of the flow control wall to form a flow space therebetween.

15. The rotary disc valve of claim 14, wherein a flow area through the flow chamber of the drive shaft is 70-130% of a flow area through the flow space.

16. The rotary disc valve of claim 13, wherein an inner surface of the valve housing defines each of the opening therein, a first aperture corresponding to a first inlet into the opening, a second aperture corresponding to a second inlet into the opening, a third aperture corresponding to a first outlet from the opening, and a fourth aperture corresponding to a second outlet from the opening.

17. The rotary disc valve of claim 16, wherein, when the rotatable assembly is rotatably adjusted to a first rotational position, a first flow path through the rotary valve includes a first fluid flowing from the first aperture to the fourth aperture while passing along the outer surface of the flow control wall and through the outer passage of the rotary disc and a second flow path through the rotary valve includes a second fluid flowing from the second aperture to the third aperture while passing through the inner flow passage of the rotary disc and the flow chamber of the drive shaft.

18. The rotary disc valve of claim 17, wherein, when the rotatable assembly is rotatable adjusted to a second rotational position, a third flow path through the rotary valve includes the first fluid flowing from the first aperture to the third aperture while passing along the outer surface of the flow control wall and through the outer passage of the rotary disc and a fourth flow path through the rotary valve includes the second fluid flowing from the second aperture to the fourth aperture while passing through the inner flow passage of the rotary disc and the flow chamber of the drive shaft.

19. The rotary disc valve of claim 17, wherein the second fluid changes from flowing in a first direction to flowing in an opposing second direction when flowing through the flow chamber of the drive shaft.

20. The rotary disc valve of claim 17, wherein the first aperture is disposed diametrically opposed to the third aperture and the second aperture is disposed diametrically opposed to the fourth aperture.

\* \* \* \* \*